May 12, 1936.   E. SWEETLAND ET AL   2,040,717
PROCESS OF PURIFYING CONCENTRATED CAUSTIC SODA SOLUTIONS
Filed Feb. 17, 1934
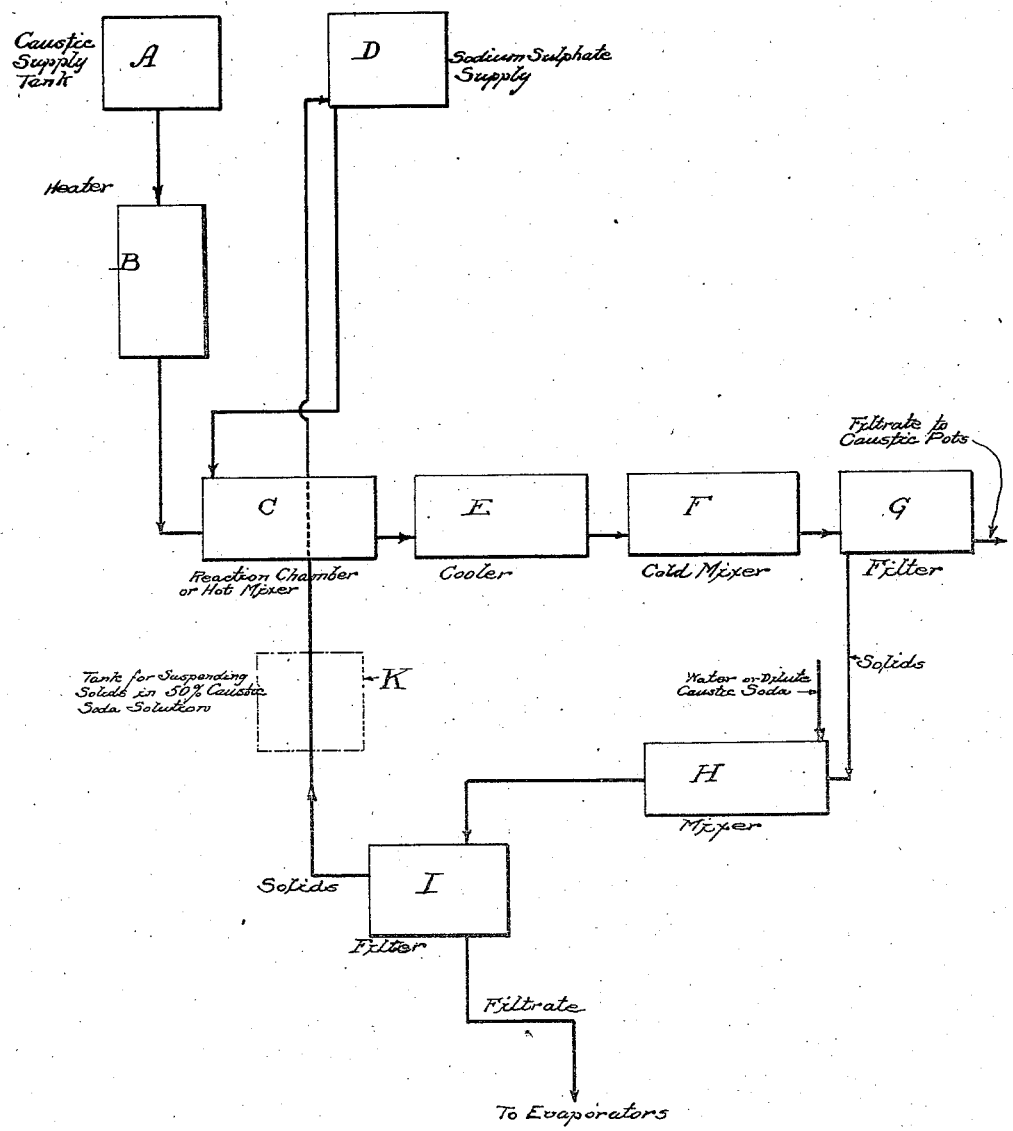

Patented May 12, 1936

2,040,717

UNITED STATES PATENT OFFICE 2,040,717

PROCESS OF PURIFYING CONCENTRATED CAUSTIC SODA SOLUTIONS

Earl Sweetland, Grosse Isle, and Raymon E. Vander Cook, Inkster, Mich., assignors to Pennsylvania Salt Manufacturing Company, Philadelphia, Pa., a corporation of Pennsylvania Application February 17, 1934, Serial No. 711,783

6 Claims. (Cl. 23—184)

The present invention relates to a process of purifying concentrated caustic soda solutions, and more particularly it relates to a process by which the sodium chloride accompanying the concentrated caustic soda solutions may be economically and easily removed by a continuous process.

One object of our invention is to provide a process by which the sodium chloride contaminating concentrated caustic soda solutions may be removed therefrom by the formation of relatively large crystals of a complex salt embodying sodium chloride as one component, which crystals are easily removed from the purified solution either by filtration or by settling and decantation.

A further object of the invention is to furnish a process for the purification of caustic soda solutions in which the removal of sodium chloride therefrom is unaccompanied by the contamination of the solution by the compound added to cause the removal of the sodium chloride.

Still another object of our invention is to provide a cyclic process for the purification of caustic soda solutions by which the sodium sulphate employed in the removal of the sodium chloride is economically and easily recovered, and thus made available for further use in the process.

Still another object of the present invention is to provide a continuous process for the removal of sodium chloride from concentrated soda solutions which may be expeditiously carried out and will accomplish the objects hereinbefore recited.

Other objects will be apparent from a consideration of the specification and claims.

In the accompanying drawing, a flow sheet is shown illustrating the preferable, complete process of the present invention.

A process for the purification of concentrated caustic soda solutions is described and claimed in United States Letters Patent No. 1,888,886, granted November 22, 1932. The process there described involves the addition of sodium sulphate or a compound forming sodium sulphate to concentrated caustic soda solutions in order to form with the sodium chloride a complex salt insoluble in the caustic soda solution.

The present process is an improvement on the process of the patent, and while the same general chemical reaction is relied upon, the present process is a marked advance thereover.

The complex salt formed in accordance with the patent, for example, is relatively fine, and difficulty is encountered in separating it from the solution; while in accordance with the process of the present invention relatively large crystals are obtained which may be easily removed. The crystals obtained following the process of the patent are approximately ten microns in length, and two or three days are required for settling. The filtering rate is also slow, less than one hundred pounds of liquor per square foot of filtering surface per hour passing through a 250-mesh screen filter under fifteen inches vacuum. In accordance with the process of the present invention crystals from 70 to about 125 microns in length are formed, resulting in rapid settling and a high filtering rate of over a thousand pounds of liquor per square foot of filtering surface per hour under the same filtering conditions.

In the process of the patent, the solution being purified becomes contaminated by sodium sulphate employed in excess to cause the precipitation of the complex salt. If a solution of a high degree of purity is desired, the caustic soda solution must be further purified by an additional chemical treatment to bring about the precipitation of the excess sulphate, such additional treatment being disclosed in United States Letters Patent No. 2,003,734 granted under date of June 4, 1935. In the present process, due to the conditions maintained therein, it is possible to remove the excess sulphate with the precipitated complex salt, and, therefore, no additional purification step is required. In addition to these features, the patent discloses only a batch process, while that of the present invention is continuous and economical in its operation.

In conjunction with the other steps of the process, the invention contemplates the recovery of the sodium sulphate used to bring about the precipitation of the sodium chloride and a process is provided which is cyclic in nature, the sodium sulphate recovered being returned for further use in the purification of the concentrated caustic soda solution.

The process of the present invention comprises the heating of the solution to be purified to a temperature of at least 60° C.; the addition of a predetermined amount of sodium sulphate, preferably in finely divided form to the heated caustic soda solution; the mixing of the solution and the sodium sulphate while in a heated condition until the reaction is substantially complete; the cooling of the solution and suspended solids, preferably rapidly; the slow mixing or agitation of the cooled liquor for a relatively long period of time; and the separation of the solids from the purified liquor, either by settling or decantation or by filtration. The addition of the sodium sulphate to the hot liquor, the hot mixing, the cooling, and the cold mixing all cooperate to give the relatively desired large crystals, and the cooling and cold mixing cause the supersaturated solution of sodium sulphate and complex salt to be broken down with the consequent precipitation thereof, so that both are removed by one operation. The addition of finely divided crystals of sodium sulphate, either in powder form or suspended in concentrated caustic soda solution, is desirable since a complete reaction is assured with no waste of sulphate and no inaccuracy in control.

The process of the present invention also contemplates, in conjunction with the other steps, the treatment of the complex salt separated from the caustic soda solution with a selective solvent which separates the sodium sulphate from the other components thereof, and the return of this recovered sodium sulphate to the process, no claim being made in this application to the recovery process, per se, since that is the subject matter of United States Letters Patent No. 1,998,471 granted under date of April 23, 1935.

The process of the present invention is applicable for the treatment of caustic soda solutions, to remove sodium chloride therefrom whose concentrations are such that the complex salt formed upon the addition of sodium sulphate will be substantially insoluble therein, and the terms "concentrated caustic soda solutions" is employed to include all these concentrations. The process is particularly applicable for treatment of solutions of caustic soda containing 36% to 39% Na₂O (by weight) which have been evaporated to this concentration from lower concentrations and from which the impurities, as far as possible, have been removed by crystallization thereof. Anhydrous sodium sulphate is preferably added to form the complex salt with the sodium chloride impurity, although if desired the sodium sulphate may be formed in the solution by the addition of sulphuric acid, sodium hydrogen sulphate or those metallic sulphates which will react with the caustic soda to form sodium sulphate and the insoluble metallic hydroxide.

The amount of sodium sulphate supplied to the heated caustic soda solution to be purified is dependent on the amount of sodium chloride in the solution to be removed therefrom in the form of the complex salt whose formula appears to be $NaOH.NaCl.Na_2SO_4$, although the ratio of the individual components in the complex salt may vary slightly from this formula, for example, it may be $4NaOH.4NaCl.5Na_2SO_4$. Taking the first formula as typical, it will be seen that the minimum amount required, when complete removal is desired, is 2.43 parts of sodium sulphate for each part of sodium chloride in the solution. In some cases, it may be desirable to remove only part of the sodium chloride in the caustic soda solution, in which case the amount of complex salt formed will be dependent on the amount of sodium sulphate added. If sodium sulphate is added in amounts in excess of the theoretical ratio, the sodium chloride will be substantially completely removed. In the present process, excess sodium sulphate is not objectionable since the excess is rendered insoluble and is removed with the insoluble complex salt and may thereafter be removed for re-use. Often it is desirable from an operating standpoint to employ 3 to 4 parts of sodium sulphate to each part of sodium chloride in the solution, although in other instances the use of as high as 10 to 12 parts of sodium sulphate to each part of sodium chloride in the solution will be found to be advantageous, since with a substantial excess, the rate of formation of the complex salt is increased.

The complete process, including the recovery and re-use of the sodium sulphate, is shown in the form of a flow sheet in the accompanying drawing, although it is to be understood that the process of the invention may be carried out, if desired, without the steps involving the recovery of the sodium sulphate from the insoluble complex salt. In the flow sheet, a supply tank with a regulating device to feed a predetermined amount of concentrated caustic soda solution with a known content of sodium chloride is shown at A. The liquor is fed from supply tank A to heater B and after being heated to a temperature of at least 60° C., it is passed to the reaction chamber or hot mixer C. A supply tank D feeds a predetermined amount of sodium sulphate, either in dry powdered condition or suspended in concentrated caustic soda solution, for example approximately 50%, to the reaction chamber C. After the reaction is complete, the solution and suspended solids pass to the cooler E which is preferably constructed so as to afford rapid cooling. When the solution and suspended solids have been cooled to at least 45° C., they are passed to the cold mixer F in which they are kept in slow motion until the supersaturated solution of complex salt and sodium sulphate is broken down. The solution and suspended solids are then passed to a filter G, preferably of the rotary vacuum type, from which the filtrate is ready for shipment, or may be delivered to the caustic pots for evaporation. If it is desired to recover the sodium sulphate, the solids obtained by the filtering operation are passed to a mixer H into which a predetermined amount of water or dilute caustic soda is admitted, depending upon the amount of complex salt to be treated. In the mixer, the selective solvent dissolves the sodium chloride and sodium hydroxide from the complex salt, the sodium sulphate remaining for the most part insoluble. The solution and suspended solids are passed to a filter I, preferably also of the rotary vacuum type, from which the filtrate is passed to the evaporators while the solids are either sent to storage or returned to the process through the sodium sulphate supply tank D. The sodium sulphate supplied to tank D may either be in dry powdered form, or may be suspended in approximately 50% caustic soda solution, in which case the solids are mixed with the caustic soda solution in a suitable tank such as tank K shown in dotted lines in the drawing.

The caustic soda solutions to be purified are fed from a supply tank or other suitable source through a regulating device of standard construction, feeding a given volume of caustic liquor containing a known amount of sodium chloride, to the heater. The heater is of any desired construction, for example, one provided with internal steam coils and insulated externally to prevent heat loss. In this heater, the caustic soda solution is heated to a temperature of at least 60° C., although higher temperatures, even approaching the boiling point of the solution may be employed if desired. For economic reasons, a temperature between 70° C. and 80° C. in most instances is preferred. The exact temperature for optimum results depends to some degree on the concentration of the caustic soda solutions. With a solution of caustic soda containing 700 grams per liter, excellent crystal formation i. e. relatively large crystals will be obtained, using temperatures in the neighborhood of 65° C., while with a solution containing 825 grams per liter, a temperature of over 100° C. gives the best results.

The heated solution is passed to a reaction chamber or hot mixer which is also insulated to prevent heat loss. The sodium sulphate or compound forming sodium sulphate in the solution is added in predetermined amounts, depending on the sodium chloride content of the solution in the reaction chamber. The use of dry powdered anhydrous sodium sulphate or of powdered anhydrous sodium sulphate suspended in 50% caustic soda solution, either purified or impure, is preferred. The amount of sodium sulphate added can be automatically controlled by known regulating means. If the suspension of sodium sulphate in concentrated caustic soda solution is employed, it is desirable to heat the suspension to the same temperature as that of the liquor to be purified before adding it to the hot mixer. In order that the sodium sulphate will go into solution in the liquor to be purified, or that the reaction will be complete immediately, it is desirable that the sodium sulphate particles shall be sufficiently fine to pass at least through a 130-mesh screen. Preferably, the particles are sufficiently fine so that 100% will pass through a 200-mesh screen, although excellent results are also obtained if 75% passes through a 200-mesh screen with the balance passing through a 150-mesh screen. It has been found that if too large particles of sodium sulphate are employed, a coating of the insoluble complex salt is built up around the particle, thus occluding available sulphate and preventing further reaction. When this occurs, there is a loss of sulphate and it is impossible to control the amounts added with accuracy.

The hot mixer or reaction chamber is provided with a suitable agitating device which insures thorough and complete mixing without causing breakage of the large crystals formed. The hot mixer is preferably of horizontal type where the solution to be purified and the sodium sulphate are added at one end and the solution and suspended solids after reaction leave by an overflow at the opposite end. The solution and added sulphate are agitated, as described, in the hot mixer until the reaction is substantially complete. While the greater percentage of the reaction is completed in a few minutes, due to the laws of chemical reaction, the remaining traces are relatively slow to react. In a typical case, where a plant is producing fifty tons of solid caustic soda per day, the materials are held in the hot mixer for thirty to sixty minutes, by controlling the flow to and from the mixer. The use of the heated solutions is contrary to the usual practices, where low temperatures are employed, due to the previous difficulties encountered in the high soluble sulphate content in the finished product. As will appear hereinafter, the subsequent rapid cooling and cold mixing of the solution of the present invention break up the supersaturated solution of the sulphate and cause it to be precipitated with the complex salt.

The caustic soda solutions and suspended solids are flowed from the hot mixer or reaction chamber to a device adapted to cool the solution to a temperature below 45° C., and preferably to a temperature between 28° C. and 33° C. It is not practical to cool below 25° C., due to the tendency for crystallization of the liquor. The construction of the cooler may be of any desired form, such as cooling towers and the like. In order to reduce the time involved in carrying out the process, an efficient cooler is preferably employed which will result in as rapid cooling as is possible.

From the cooler, the cooled liquor containing its suspended solids are delivered to a so-called mixer, the function of which is to keep the cooled material in slow motion for a period of time in order to break up the supersaturated solution and to form substantially all the complex salt and excess sodium sulphate into crystals. The movement is relatively slow in order that the large crystals previously formed will not be broken. The cold mixer may be of any desired construction, preferably of the horizontal type. Agitation is provided to move the material in the direction of flow, that is, toward the outlet, and sufficient positive motion is given to the material to retain the bulk of suspended solids in suspension. The movement in the direction of flow carries any small quantity of settled solids towards the discharge, which is in the form of an overflow at the end of the mixer. Most of the materials will be crystallized after about two hours mixing, but longer agitation results in the crystallization of the small remainder, so in general the material is held in the cold mixer for about four hours.

The purified caustic soda solution is separated from the crystalline complex salt and sodium sulphate by any suitable means. It may be passed from the cold mixer to settling tanks and the clear liquor decanted or syphoned from the settled crystalline matter, or it may be advantageously passed to a rotary vacuum filter. The clear liquor is delivered to caustic pots for further evaporation if desired.

In most cases, it will be desirable to recover and re-use the sodium sulphate since otherwise the consumption of sodium sulphate in the process is high. For a plant, for example, producing fifty tons of solid caustic soda per day, two to five tons of sodium sulphate may well be consumed, depending upon operating requirements. If the complex salt obtained in the process is subjected to the recovery process, 85% to 90% of the sodium sulphate originally employed is recovered and made available for the treatment of additional amounts of solution.

The complex salt separated from the solution is then treated with a selective solvent in such proportions with respect to the amount of complex salt that sodium chloride is to some extent at least dissolved therefrom, leaving at least some of the sodium sulphate of the complex salt undissolved. If water or an aqueous solution is employed in the treatment, a temperature above that at which Glauber's salt is found, for example a temperature of above 34° C. is used. Preferably the selective solvent is employed in the percentage which will give the maximum solubility of the sodium chloride while providing minimum solubility of the sodium sulphate, although it will be understood that the process is of value even though some sodium sulphate is not recovered, or on the other hand, even though the sodium sulphate is to some extent contaminated by sodium chloride.

The complex salt, in addition to having caustic soda as one component, contains caustic soda solution absorbed thereby since it is not partical to remove the last traces of adhering caustic liquor. The concentration of caustic soda in the solution obtained after treatment with the added solvent has been found to afford a means of control for determining the efficiency of the separation of the sodium chloride from the sodium sulphate. The caustic soda solution, itself, materially effects the solubilities of the two salts which it is desired to separate and may, therefore, be considered as the selective solvent rather than the water added. In certain instances where the amount of absorbed or adhering caustic soda solution is low, it will be of advantage to add a dilute solution of caustic soda, for example, a 10% solution in place of water alone to bring up the caustic soda content in the solution obtained after treating the complex salt to the desired concentration. The lower the concentration of caustic soda in the solution below the optimum, the greater will be the loss of sodium sulphate, while on the other hand the higher the concentration above the optimum, the greater will be the contamination of the sodium sulphate by sodium chloride. The maximum solubility of the sodium chloride with the minimum solubility of sodium sulphate is obtained when the concentration of the final solution is about 21% NaOH or about 60° Twaddell. In general, the economic limits will be found to be between 16% NaOH and 26% NaOH, but as pointed out previously the process of the invention is not limited to the use of the most desirable conditions.

In a typical case where the maximum recovery of relatively uncontaminated sodium sulphate is desired and where in the purification process 3 parts of sodium sulphate are added for each part of sodium chloride in the caustic solution to be purified, 4 parts of the complex salt, containing about 20% water after treatment on a vacuum filter at 15 inches of vacuum, are brought into contact with 3 parts (by weight) of water. In this instance, the liquid obtained averages about 21% caustic soda. Under other conditions, adjustment to meet the given conditions may be made in the ratio of water added to complex salt to produce the desired concentration of caustic soda in the solution. It is preferable to agitate the solution and suspended crystals for a period of fifteen to twenty minutes in order to obtain complete solution of the sodium chloride.

The complex salt directly from the filter, or from storage if desired, is allowed to drop into a mixer to which is added the necessary amount of water or aqueous solution as heretofore described. The mixer is preferably of the horizontal type and the complex salt and selective solvent are advantageously added continuously at one end, the solution and undissolved sodium sulphate overflowing at the opposite end. The mixer is preferably of such capacity that the material will remain therein for fifteen to twenty minutes during which time the material is agitated to insure dissolution of the sodium chloride and caustic soda. The material obtained as the overflow from the mixer is discharged to suitable separating apparatus, preferably a rotary vacuum filter, the recovered sodium sulphate being used again in the form of a dry powder, a paste or a suspension in concentrated caustic soda solution such as a 50% solution in the purification process while the solution is returned to the evaporators.

In a typical case, concentrated caustic soda solution containing 775 grams per liter of $Na_2OH$ and 14 grams per liter of NaCl is heated to approximately 80° C. in the heater and is then passed at the rate of 8400 pounds per hour into the hot mixer. In the hot mixer, 323 pounds of anhydrous sodium sulphate per hour, either in dry powder form or suspended in a 50% caustic soda solution, are added to the solution. The rate of flow through the system is as follows: From the heater B to the cooler E, one hour; from the hot mixer C to the cold mixer F, twenty minutes; from the cooler E to the filter G, or settling tanks, four hours. The liquor and suspended solutions are cooled to approximately 30° C. in the cooler. The liquor obtained from the filter or settling tanks contains 760 grams per liter NaOH and 4 grams per liter of sodium chloride and sodium sulphate combined. When evaporated to dryness, two tons of caustic soda per hour testing 76.8% $Na_2O$ and .54% combined sodium chloride and sodium sulphate is obtained.

The moist solids obtained from the filter average 800 pounds per hour and these are passed to the mixer H to which 600 pounds of water per hour is added. The rate of flow through the mixer is such that the material is retained therein for a period of fifteen to twenty minutes. The solution and suspended solids are then passed to a filter, the insoluble sodium sulphate separated from the solution by the filter amounting to 275 pounds per hour or a recovery of 85%. The filtrate is passed to the evaporators while the solids are returned to the system and employed in further purification of caustic soda solutions.

Considerable modification is possible in the physical factors and equipment employed without departing from the essential features of the present invention.

We claim:

1. The process of purifying concentrated caustic soda solutions to remove sodium chloride therefrom, which comprises heating the solution to a temperature of at least 60° C., adding very finely divided sodium sulphate to the solution at said temperature to form relatively large crystals of an insoluble salt containing sodium sulphate and at least a portion of the sodium chloride impurity, mechanically mixing the solution and sodium sulphate slowly without appreciable breakage of the formed crystals and at said temperature until the reaction involving the formation of an insoluble complex salt is substantially complete, cooling the solution and suspended solids to a temperature below 45° C., slowly agitating mechanically the mass of solution and suspended solids at said temperature until the supersaturated solution is substantially completely broken down, the degree of agitation being insufficient to cause appreciable breakage of the crystallized solids, and thereafter separating the solution from the crystallized solids.

2. The process of purifying concentrated caustic soda solutions to remove sodium chloride therefrom which comprises heating the solution to a temperature in the neighborhood of 70° C. to 80° C., adding sodium sulphate sufficiently fine to pass at least through a 150 mesh screen to the solution at said temperature in amounts in excess of that theoretically required to react with the sodium chloride present to form relatively large crystals of an insoluble complex salt containing the sodium chloride and sodium sulphate, mechanically mixing the solution and sodium sulphate slowly without appreciable breakage of the formed crystals and at said temperature for approximately one hour, cooling the solution and suspended solids rapidly to a temperature in the neighborhood of 30° C., mechanically mixing the mass of solution and suspended solids at said temperature for approximately four hours, the degree of agitation being insufficient to cause appreciable breakage of the crystallized solids, and thereafter separating the crystallized complex salt and sodium sulphate from the solution.

3. The process of purifying concentrated caustic soda solutions to remove sodium chloride therefrom which comprises heating the solution to a temperature of at least 60° C., adding very finely divided sodium sulphate thereto at said temperature to form relatively large crystals of an insoluble salt containing sodium sulphate and at least a portion of the sodium chloride impurity, mechanically mixing the solution and sodium sulphate slowly without appreciable breakage of the formed crystals and at said temperature until the reaction involving the formation of an insoluble complex salt is substantially complete, cooling the solution and suspended solids to a temperature below 45° C., slowly agitating mechanically the mass of solution and suspended solids at said temperature until the supersaturated solution is substantially completely broken down, the degree of agitation being insufficient to cause appreciable breakage of the crystallized solids, separating the solution from the crystallized solids, treating the solids with a selective solvent which dissolves sodium chloride and caustic soda therefrom, leaving sodium sulphate substantially undissolved, separating the solids from the solution, and thereafter re-using the recovered sodium sulphate in the process for the purification of further amounts of caustic soda solution.

4. The process of purifying concentrated caustic soda solutions to remove sodium chloride therefrom which comprises heating the solution to a temperature of at least 60° C., adding anhydrous sodium sulphate sufficiently fine to pass at least through a 150 mesh screen thereto at said temperature in amounts in excess of that theoretically required to react with the sodium chloride present to form relatively large crystals of an insoluble salt containing the sodium chloride and sodium sulphate, mechanically mixing the solution and sodium sulphate slowly without appreciable breakage of the formed crystals and at said temperature until the reaction involving the formation of an insoluble complex salt is substantially complete, cooling the solution and suspended solids to a temperature below 45° C., slowly agitating mechanically the mass of solution and suspended solids at said temperature until the supersaturated solution is substantially completely broken down, the degree of agitation being insufficient to cause appreciable breakage of the crystallized solids, separating the solution from the crystallized complex salt and sodium sulphate, treating the complex salt with water in such amounts that the sodium chloride and caustic soda are substantially completely dissolved therefrom without dissolving an appreciable amount of the sodium sulphate, separating the solids from the solution, and thereafter re-using the recovered sodium sulphate in the process for the purification of further amounts of caustic soda solution.

5. The process of purifying concentrated caustic soda solutions to remove sodium chloride therefrom which comprises heating the solution to a temperature of at least 60° C., adding sodium sulphate sufficiently fine to pass at least through a 150 mesh screen thereto at said temperature to form relatively large crystals of an insoluble salt containing sodium sulphate and at least a portion of the sodium chloride impurity, mechanically mixing the solution and sodium sulphate slowly without appreciable breakage of the formed crystals and at said temperature until the reaction involving the formation of an insoluble complex salt is substantially complete, cooling the solution and suspended solids to a temperature below 45° C., slowly agitating mechanically the mass of solution and suspended solids at said temperature until the supersaturated solution is substantially completely broken down, the degree of agitation being insufficient to cause appreciable breakage of the crystallized solids, separating the solution from the crystallized complex salt and sodium sulphate, treating the complex salt with water in such amounts that the solution obtained is between 16% and 26% caustic soda to dissolve sodium chloride and caustic soda therefrom leaving sodium sulphate undissolved, separating the solids from the solution, and thereafter re-using the recovered sodium sulphate in the process for the purification of further amounts of caustic soda solution.

6. The process of purifying concentrated caustic soda solutions continuously to remove sodium chloride therefrom, which comprises continuously flowing the solution to be purified to a heating chamber, heating said solution therein to at least 60° C., continuously passing the heated overflow from said chamber to a mixing chamber, continuously adding very finely divided sodium sulphate to the solution at said temperature to form relatively large crystals of an insoluble complex salt containing sodium sulphate and at least a portion of the sodium chloride impurity, mechanically mixing the solution and sodium sulphate slowly without appreciable breakage of the formed crystals and at said temperature until the reaction involving the formation of the insoluble complex salt is substantially complete, continuously cooling the overflow from said chamber to a temperature below 45° C., continuously slowly agitating mechanically the mass of solution and suspended solids in a mixing chamber until a supersaturated solution is substantially completely broken down, the degree of agitation being insufficient to cause appreciable breakage of the crystallized solids, passing the overflow from said chamber to a separating apparatus, and separating the solids from the solution thereby.

EARL SWEETLAND.
RAYMON E. VANDER COOK.